Patented Apr. 25, 1939

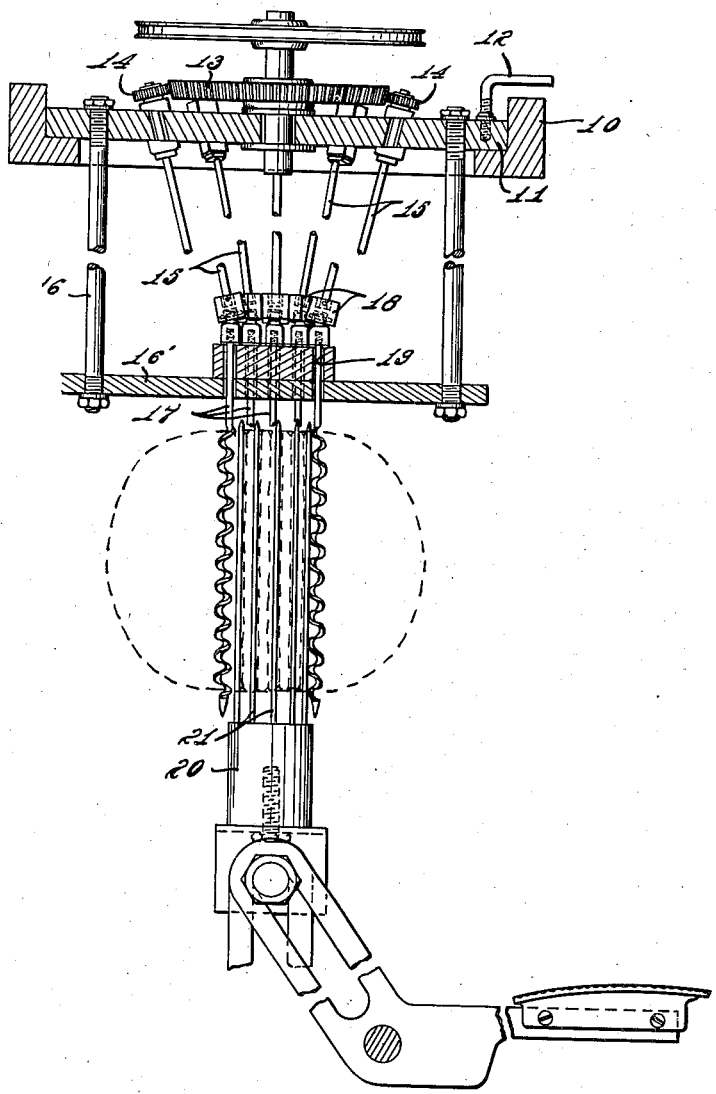

2,155,768

UNITED STATES PATENT OFFICE 2,155,768

APPARATUS FOR FORMING SEGMENT-APEX CAVITIES IN CITRUS FRUITS

Ralph Polk, Sr., Tampa, and Ralph Polk, Jr., Haines City, Fla.

Application December 22, 1937, Serial No. 181,074

2 Claims. (Cl. 146—3)

In mechanically obtaining substantially whole juice-cell segments from citrus fruits, it has been found advisable to form an axially extending void at the apex of each segment between the radially extending portions of the inedible integument without rupture of the integument and without rupture of the natural bond between adjacent integuments, the seeds, if any, being removed polarwise of the fruit during the formation of that void, in order to facilitate the introduction and operation of a suitable tool for stripping the juice-cell segment from the integument.

The object of our present invention is to provide improved means for the production of these desired voids and seed removal.

The accompanying drawing is an axial section of an embodiment of our invention, some of the augers being omitted for sake of clarity.

In the drawing 10 indicates an annular horizontal support in which is journaled a plate 11 angularly adjustable in support 10 by any suitable means such as a handle 12.

Journalled centrally on plate 11 is a gear 13 with which mesh a plurality of pinions 14 each of which is carried by one of a circumferential series of shafts 15 journalled in plate 11.

Depending from plate 11 are hangers 16 the lower ends of which support a cross-head 16' in which are journalled the shanks of a circumferential series of augers 17, each shank being rotatively connected to the lower end of one of the shafts 15 by a suitable universal joint 18. The bores 19, in which the shanks of the augers are journalled, afford a loose fit for said shanks so that the augers have a limited amount of lateral displaceability.

The apices of the segment integuments of the juice-cell groups in citrus fruits are circumferentially grouped about an axial void extending from pole to pole of the fruit but this central void is rarely at the precise axial diameter of the fruit, segments at one side of the fruit generally having a greater radial extent than at the other.

Consequently the peeling is preferably removed from the fruit so that the peeled, but otherwise whole fruit may be accurately positioned by an operator on a holding fork 20 which comprises a circumferential series of small-diameter tines 21 arranged to penetrate an average fruit in the crotches of the integuments. The augers 17 are arranged in a circumferential series to closely enclose the series of tines 21.

Grape fruit comprise from ten to sixteen segments but if the fruit has more than eleven segments, several of the segments will have so small an included angle that they may be ignored in commercial operations.

Consequently, we have found it convenient, for operation on grape fruit, to provide ten or eleven augers of about $\frac{5}{16}''$ diameter.

Any suitable means may be provided for securing projection of the augers polarwise with the fruit and in the drawing we have shown the fork 20 carried by a vertically movable carriage manipulated by a foot treadle.

The circumferential portions of the juice-cell integuments are preferably removed from the fruit with the peeling and when the tapered lower ends of augers enter the fruit the tips of these tapered ends enter between the flaring portions of the integuments and, because of the loose journalling, the augers readily adjust themselves as the augers penetrate the fruit, a very small portion of the juice-cells—and the seeds—being removed from the apex of each penetrated juice-cell segment as the augers proceed through the fruit.

As a single pass of the augers may fail to form proper voids at the apices of the integuments, the augers may be withdrawn, the plate 11 shifted slightly angularly and the augers again passed through the fruit.

The augers are preferably of the type shown wherein the shank, within the spiral, is gulleted.

This application is a continuation, in part, of our application Serial Number 34,349 filed August 2, 1935, now Patent 2,121,098.

The term "circumferential series" used in the specification and claims, is intended to include an arc shaped series of less than 360° extent.

We claim as our invention:

1. Apparatus for acting on citrus fruits, comprising a circumferential series of parallel augers arranged to enter individual juice-cell integuments within the apices thereof, means for rotating said augers, a fruit holder comprising a circumferential series of tines parallel with the augers and arranged to penetrate a fruit within the apices of juice-cell integuments, and means by which one circumferential series may be telescoped over the other.

2. Apparatus for acting on citrus fruits, comprising a holder, a circumferential series of parallel journal bearings formed in said holder, a circumferential series of augers having their shanks appreciably smaller than and jounaled in said bearings whereby each auger may shift appreciably laterally in its bearings, the diameter of said circumferential series of bearings being such that the augers may penetrate the tips of the fruit segments between the radiating integuments closely adjacent their apices and the bearing looseness permitting automatic adjustment of the augers to the fruit segments to avoid integument rupture, and means by which said augers may be rotated.

RALPH POLK, SR.
RALPH POLK, JR.